US005670088A

United States Patent [19]
Chittofrati et al.

[11] Patent Number: 5,670,088
[45] Date of Patent: Sep. 23, 1997

[54] PREPARATION OF MIXED ULTRAFINE PARTICLES FROM PFPE MICROEMULSION

[75] Inventors: Alba Chittofrati; Viviana Boselli, both of Milan, Italy

[73] Assignee: Ausimont S.p.A., Milan, Italy

[21] Appl. No.: 475,105

[22] Filed: Jun. 7, 1995

[30] Foreign Application Priority Data

Jun. 9, 1994 [IT] Italy ................... 94 A 001211

[51] Int. Cl.$^6$ .................. B01J 13/00; H01F 1/20
[52] U.S. Cl. .......... 252/314; 252/309; 252/62.52; 252/518; 252/519; 252/520
[58] Field of Search .................. 252/309, 314, 252/62.52, 518, 519, 520

[56] References Cited

U.S. PATENT DOCUMENTS

| 3,665,041 | 5/1972 | Sianesi et al. | 568/601 |
|---|---|---|---|
| 3,764,540 | 10/1973 | Khalafalla et al. | 252/314 |
| 3,843,540 | 10/1974 | Reimers et al. | 252/62.52 |
| 4,094,804 | 6/1978 | Shimoiizaka | 252/62.52 |
| 4,523,039 | 6/1985 | Lagow et al. | 568/615 |
| 4,990,283 | 2/1991 | Visca et al. | 252/309 |
| 5,049,307 | 9/1991 | Tabony | 252/309 |
| 5,147,573 | 9/1992 | Chagnon | 252/519 |
| 5,147,841 | 9/1992 | Wilcoxon | 252/309 |
| 5,238,671 | 8/1993 | Matson et al. | 252/309 |
| 5,382,614 | 1/1995 | Scarati et al. | 524/108 |

FOREIGN PATENT DOCUMENTS

| 0 051 526 | 5/1982 | European Pat. Off. . |
|---|---|---|
| 0 148 482 | 7/1985 | European Pat. Off. . |
| 0 176 760 | 4/1986 | European Pat. Off. . |
| 0 250 766 | 1/1988 | European Pat. Off. . |
| 0 370 939 | 5/1990 | European Pat. Off. . |
| 0 603 697 | 6/1994 | European Pat. Off. . |

OTHER PUBLICATIONS

Säynätjoki et al., "Magnetic Fluids in Sealing and Lubrication—A State of the Art Review," Journal of Synthetic Lubrication vol. 10–2, 119–131, Oct. 1993.

European Patent Office Search Report dated Dec. 16, 1996.

Robinson et al., "Characterisation of Cadmium Sulphide Collides in Reverse Micelles," Colloids and Surfaces 61, 175–188, (1991).

Persico et al., "Synthesis of Perfluoropolyethers via Hydrocarbon Polyesters: A New General Method," J. Am. Chem. Soc. 107, 1197–1201, 1985.

López–Quintela et al., "Chemical Reactions in Microemulsions: A Powerful Method to Obtain Ultrafine Particles," Journal of Colloid and Interface Science 158, 446–451, (Jan., 1993).

Davies et al., "The Effect of Temperature and Oleate Adsorption on the Growth of Maghemite Particles," Journal of Magnetism and Magnetic Materials, 122:24–28 (1993) (Month not available).

Lopez–Quintela et al., "Obtention and Characterisation of Ultrafine Magnetic Colloidal Particles in Solution," The Structure Dynamics and Equilibrium Properties of Colloidal Systems, 773–788, (1990).

Lopez–Quintela et al., "Quantum Effects in Ultrafine Nd–Fe–B Particles," Science and Technology of Nanostructured Magnetic Materials 567–572 (1991).

Sager et al., "Precipitation of Nanometre-sized Uniform Ceramic Particles in Emulsions," Colloids and Surfaces A: Physicohemical and Engineering Aspects 79, 199–216, (Jan. 1993).

Nagy, "Multinuclear NMR Characterization of Microemulsions: Preparation of Monodisperse Colloidal Metal Boride Particles," Colloids and Surfaces 35, 201–220, (1989).

Dvolaitzky et al., "Silver Chloride Microcrystals Suspensions in Microemulsion Media," J. Dispersion Science and Technology 4(1), 29–45, (1983).

Hemmi, "Trend of Magnetic Fluids and Its Application," Japanese Journal of Tribology 37, (2): 149–158, (1992).

Lee et al., "Synthesis and Characterization of Stable Colloidal $Fe_3O_4$ Particles in Water-in-Oil Microemulsions," IEEE Transactions on Magnetics 28, 5, 3180–3182, (Sep. 1992).

Primary Examiner—Richard D. Lovering
Assistant Examiner—Daniel S. Metzmaier
Attorney, Agent, or Firm—Finnegan, Henderson, Farabow, Garrett & Dunner

[57] ABSTRACT

Process for preparing dispersions containing mixed oxides having particle size lower than or equal to 50 nm and having narrow size distribution, comprising the following steps:

P1) preparing a microemulsion of water in oil, the oil being a perfluoropolyether, said microemulsion being obtained using a perfluoropolyether surfactant, the aqueous phase consisting of a solution of an inorganic salt of a M1 metal;

P2) preparing a M2 metal salt of an anionic perfluoropolyether surfactant, such salt being soluble in the perfluoropolyether oil used in P1, the amount by moles of surfactant being such as to fully bind to the cation and so as not to be in excess;

P3) adding P2 to P1 for obtaining the reaction system containing the two metals M1 and M2; M1 in aqueous phase and M2 in perfluoropolyether oil phase;

P4) adding alkali solution to P3 with contemporaneous or subsequent heating, if P3 has not yet been heated, at the temperature necessary to form the desired oxide; then cooling and separating the aqueous supernatant;

M1 and M2 belong to the metals capable of giving oxides; when the two metals M1 and M2 have different valence, then M1 is the metal ion with lower valence, different from Fe(II), optionally in admixture with Fe(II), M2 is the metal ion with higher valence.

12 Claims, No Drawings

PREPARATION OF MIXED ULTRAFINE PARTICLES FROM PFPE MICRO-EMULSION

The present invention relates to a process for preparing dispersions of ultrafine mixed inorganic particles, having particle size lower than 50 nm, preferably lower than 10 nm, and with narrow size distribution and high concentration.

Ultrafine particles, having sub-micron sizes and uniform size distribution, have a particular application interest in various technological areas such as for instance the preparation of:

(a) photographic emulsions (M. Dvolaitzky, R. Ober, C. Taupin, R. Antbore, X. Auvray, C. Petipas and C. Williams in J. Dispersion Science and Technology, 4, 1983, 29–45, "Silver Chloride Microcrystals Suspensions in Microemulsion Media")

(b) heterogeneous catalysts with high reaction surface and maximum surface/volume ratio, for instance of the type described by J. Nagy in Colloids and Surfaces, 35, 1989, 201–220, "Preparation of Monodisperse Colloidal Metal Boride Particles. Multinuclear NMR characterization-of Microemulsion".

(c) ceramic materials of improved quality, as described by W. Sager, H. F. Eicke and W. Sun in Colloids and Surfaces A: Physicochemical and Engineering Aspects, 79, 1993, 199–216, "Precipitation of Nanometer-sized Uniform Ceramic particles in Emulsions".

In these cases, as well as in the case of inorganic pigments for paints or cosmetics, the small size and the particles uniformity are favourable characteristics for the homogeneity of the formulations and for the dispersibility of the powder in the various liquids wherein it must be used under the form of uniform dispersion (water, polar and unpolar organic solvents).

For instance it is known that the agglomeration or sedimentation limits the uniform and defect-free, application of paints and decreases the effectiveness of heterogeneous catalysts. It is also known that one of the parameters concurring to the colloidal stability of dispersions is the granulometry of the dispersed solid.

The ultrafines particles of semiconductors (for instance B. H. Robinson, T. F. Towey, S. Zourab, A. J. Visser, A. van Hoek in Colloid and Surfaces, 61, 1991, 175–188 "Characterization of Cadmium Sulphide Colloids in Reverse Miceles") or of magnetic materials of various type, for instance those described by M. A. Lopez-Quintela and J. Rivas in "Science and Technology of Nanostructured Magnetic Materials" eds. G. C. Hadjipanayis and G. A. Prinz, Plenum Press, NY 1991, p. 567–572 (Quantum Effects in Ultrafine Nd-Fe-B Particles" and in "The Structure, Dynamics and Equilibrium Properties of Colloidal Systems", eds D. M. Bloor and E. Wyn-Jones, Kluwer Academic Publishers, Netherlands, 1990, p. 773–788 ("Obtention and Characterization of Ultrafine Magnetic Colloidal Particles in Solution") are of particular technological interest. These materials having a very high subdivision degree have lately shown new physical properties, for instance optical and magnetic properties, different from those of the same materials in bulk.

More in detail, the invention illustrates the process for preparing dispersions of magnetic oxides which find particular application as magnetic fluids.

Ultrafines particles of magnetic oxides show superparamagnetic behaviour and are utilizable for preparing liquid magnets or ferrofluids of the type described for instance by M. Saynattjoki and K. Holmberg in Synthetic Lubrication, 10, 1993, 119–131, "Magnetic Fluids in Sealing and Lubrication: a State of Art Review" or by T. Hemmi in Japanese Journal of Tribology, 37, 1992, 155–157, "Trend of Magnetic Fluids and its Application".

The particles are generally dispersed in water or non polar solvents (hydrocarbons), the dispersions need to have high stability with respect to agglomeration or sedimentation in order to be able to respond quickly and without magnetic hysteresis to the imposition of an external magnetic field. They are used in various types of devices as explained in the two above mentioned reviews and, for instance, in patents:

U.S. Pat. No. 5,147,573, M. S. Chagnon "Superparamagnetic Liquid Colloids";

U.S. Pat. No. 4,094,804, J. Shimoiizaka "Method for Preparing Water Base Magnetic Fluid and Product";

EPA 370,939, M. A. Lopez-Quintela, J. Rivas Rey, J. Quiben Solla, "Process to Obtain Fine Magnetic Nd-Fe.B Particles of Various Sizes";

U.S. Pat. No. 3,764,540, S. E. Khalafalla, G. R. Reimers "Magnetofluids and their Manufacture";

U.S. Pat. No. 3,843,540, G. W. Reimers, S. A. Khalafalla "Production of Magnetic Fluids by Pepetization Techniques".

Various known techniques for preparing particles are described in the review of Lopez-Quintela and Rivas "Obtention and Characterization of Ultrafine Magnetic Colloidal Particles in solution". The synthesis procedures in aqueous solution show difficulties in the control of the particle size and size distribution, as well as the methods of prolonged milling. Other techniques, such as gas evaporation or sputtering, require complex equipments and are scarcely applicable owing to the high costs.

The drawback of the methods commonly used is the poor particle dimensional control, both in size and size distribution. In particular, aggregation phenomena can occur in these processes.

In fact, in an aqueous reaction medium, particles having large sizes, generally larger than 100 nm, are obtained.

When an oil-based dispersion is needed, the particles are generated in water and a surfactant is generally added to the particle aqueous dispersion to form coated particles which can be directly transferred into the oil or separated and dried from water before redispersing them in oil (see for instance U.S. Pat. No. 5,147,573).

A further characteristic needed by the particles dispersions is the colloidal stability with time. In fact, if these particles undergo aggregation and ultimate sedimentation upon aging or use conditions (eg. temperature, smear, magnetic field etc.), it is no longer possible to obtain a stable dispersion and it is thus necessary to proceed to the replacement of the dispersion in the device wherein they are used, for instance as magnetic fluids.

It is also known in the art that in order to limit the particles growth to a diameter lower than 50 nm, it is necessary to use microemulsions of water in hydrocarbon.

By these methods the size distribution is narrower and phenomena of magnetic hysteresis are generally not present.

The production of ultrafine particles is possible by utilizing microemulsions of water-in-oil as described in EPA 370,939, which illustrates also the properties of the microemulsions. The method is based on the presence of microdroplets of water, used as microreactors kept in an inert medium oil. This technique has been applied to various inorganic materials generated in hydrocarbon microemulsions with the advantages described by Lopez-Quintela and Rivas in J. Colloid Interface Science 158, 1993, 446–451 "Chemical Reactions in Microemulsions: a Powerful Method to Obtain Ultrafine Particles"

Generally the amount of solid generated in situ in microemulsions is low.

In these processes, which employ microemulsions, one or more microemulsions are utilized, each containing a low concentration of reactants.

The drawback of these processes is the low concentration of the solid particles generated in microemulsions.

All the known methods for preparing particles in microemulsions are based on the incorporation of the reactants, water-soluble metal salts, in the microdispersed aqueous phase.

When particles of mixed materials are prepared it is necessary to utilize at least two different metal cations as reactants, the introduction of which in microemulsion is critical, for instance, the increase of ionic strength can destabilize the microemulsion. The constrains on the reactant concentrations not to cause microemulsion breakdown, limit the amount of final product in the system.

In the prior art for preparing magnetic oxides in hydrocarbons the following procedures are, for instance, described:

addition of concentrated aqueous solutions of ferric chloride and ammonium hydroxide to a microemulsion containing ferrous chloride; or addition of ferrous chloride to a microemulsion containing ferric chloride and ammonium hydroxide; or addition of a base to a microemulsion containing Fe (II) and Fe (III) salts.

From the experimental data reported, it is deduced that the reactants conversion, even supposing a 100% yield, can lead to a content of magnetite in the oil not higher than 3%.

In Lee K. M. et al, IEEE Trans. on Magnetics, 28, No. 5, 1992, 3180-3182, the mixing of two hydrocarbon microemulsions is described, one containing the base and the other containing the ferric and ferrous chlorides. The solid is extracted and its magnetic saturation is about 20 emu/g (1290 Gauss).

From the reported data, it can be deduced that the solid content in the dispersions prepared via microemulsion never exceeds the 3% by weight in the oil. Therefore, such dispersions have very low magnetization, often below the detection limit for the magnetization measurements. It is evident that these dispersions have no utility from the industrial point of view.

The Applicant has surprisingly found that it is possible to obtain dispersions of ultrafine particles of size lower than 50 nm, preferably lower than 10, if microemulsions of perfluoropolyethers, of the water in PFPE (W/O) type, are utilized according to the process described hereinunder.

Comparative tests Carried out by the Applicant using microemulsions based on perfluoropolyether oils, instead of the hydrogenated oils, according to the processes of the prior art, led to poor results similar to those reported in the literature cited.

Object of the present invention is therefore a process for preparing dispersions containing mixed oxides having size lower than or equal to 50 nm, preferably lower than 10 nm, and having narrow size distribution, comprising the following steps:

P1) the preparation of the microemulsion of water-in-oil type, the oil being a perfluoropolyether, said microemulsion being obtained by using a perfluoropolyether surfactant of anionic, cationic or nonionic type, the aqueous phase that is the dispersed phase of the microemulsion consists of a solution of an inorganic salt of a M1 metal;

P2) the preparation of the second metal reactant M2 in the form of metal salt of an anionic fluorinated surfactant, preferably anionic and perfluoropolyether type, more preferably of carboxylic perfluoropolyether type, said metal salt having the characteristic of being soluble in the fluoropolyether oil used for preparing the P1 microemulsion, the amount by moles of surfactant being sufficient to fully bind to the metal cation and not to be in excess;

P3) the addition of the salt obtained in P2 to the P1 microemulsion to obtain a reaction system containing the two metals M1 and M2; M1 in aqueous phase and M2 in the perfluoropolyether oil phase;

P4) the addition of alkali or alkali solution to the reaction system P3 with contemporaneous or subsequent heating, if P3 has not yet been heated, at the temperature necessary to form the desired oxide; then cooling and separating the aqueous supernatant;

M1 and M2 are metal cations belonging to the I b, II b, III a-b, IV a-b, V a-b groups and the metals of the VII and VIII groups; when the two metal ions M1 and M2 have different charge or valence, M1 is the metal ion with lower valence, different from Fe(II), optionally in admixture with Fe(II), and M2 is the metal ion with higher valence.

Heating is generally carried out at temperatures of 60° C.–100° C.

The final heating is required for obtaining a dispersion of magnetic particles in oil with good magnetic characteristics, when it is a magnetic oxide.

It is surprising that by operating according to the process of the invention where one of the reactants is in the oil-phase the formation of magnetic oxides is quickly obtained with concentration higher than those of the prior art without an increase in the particles size and/or a higher polydispersity.

An alternative method to the one indicated above consists in that, instead of preparing the microemulsion P1 with the metal M1, it is possible to solubilize the salt of the metal M2, obtained according to P2, in a perfluoropolyether oil, and then use this solution as the oil phase for preparing the microemulsion P1. In this case, P1 coincides with P3, i.e. the microemulsion P1 includes M1 and M2.

The method of the invention can be applied to any kind of inorganic particles of the classes conventionally prepared in aqueous medium, in particular oxides formed by at least two metal species and preferably magnetic oxides.

The addition of the organic salt of M2 can, in practice, be subsequent to the preparation of the microemulsion P1, or the oil phase utilized in P1 can already include the M2 salt obtained in P2.

Preferably M2 has higher valence than M1.

Generally for M1 having valence (II), Co, Ni, Mn, Ca, Zn, Ba, etc. can be cited.

For M2 having valence (III), Fe(III), Al(III), etc. can be cited.

For M2 having valence (IV), Ti(IV), Mn(IV), Zr(IV) can be cited.

In particular the method can be applied for producing mixed oxides of the type $M1_xM2_{3-x}O_4$, wherein M1 represents a divalent metal ion and M2 represents a trivalent metal ion. More particularly, nanosize particles of magnetic ferrites of the $M1Fe_2O_4$ type are prepared wherein M1 represents divalent ions of Mn, Co, Ni, Cu, Zn, Ba, pure or in admixture with each other or in admixtures with ferrous ions.

M1 is introduced into the microemulsion W/O as water-soluble inorganic salt, M2 is introduced as soluble organic salt in the oil phase.

The (W/O) microemulsions water in perfluoropolyether oil are described in Italian patent application 19494 A/87.

The perfluoropolyethers suitable to form the microemulsions subject matter of the present invention are those having average molecular weight from 500 to 10,000 and preferably from 500 to 3,000 and containing repetitive units selected from the group consisting of:

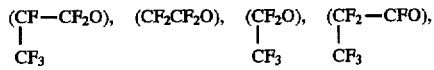

$(CF_2CF_2CF_2O)$, $(CF_2CF_2CH_2O)$, said units being statistically distributed in the polymeric chain, having neutral fluoroalkylic or perfluoroalkylic end groups which can contain H or Cl. In particular, they belong, preferably, to one or more of the following classes of perfluoropolyethers:

1) 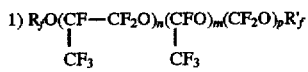

having random distribution of the perfluorooxyalkylene units, wherein $R_f$ and $R'_f$ equal or different from each other are $CF_3$, $C_2F_5$, $C_3F_5$, $CF_2H$ and n, m, p are integers such as to meet the aforesaid requirements of average molecular weight previously indicated;

2) $R_fO(CF_2CF_2O)_{n'}(CF_2O)_{m'}R'_f$ with random distribution of the perfluorooxyalkylene units, wherein $R_f$ and $R'_f$ equal or different from each other are $-CF_3$ or $-C_2F_5$ and m' and n' are integers such as to meet the aforesaid requirements;

3) 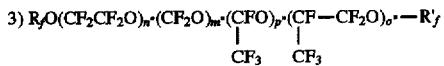

wherein $R_f$ and $R'_f$ are similar to those indicated in class (1) and m", n", p", o" are integers such as to meet the aforesaid requirements;

4) 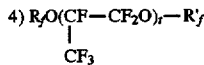

wherein $R_f$ or $R'_f$ equal or different from each other are $-C_2F_5$ or $-C_3F_7$ and t is an integer such as to meet the indicated requirements;

5) $R_fO$ $(CF_2CF_2O)$ R' wherein $R_f$ and $R'_f$ equal or different from each other are $-CF_3$, $-C_2F_5$ and z is an integer such as to meet the aforesaid requirements;

6) $R_fO(CF_2CF_2CF_1O)_sR'_f$ wherein $R_f$ and $R'_f$ equal or different from each other are $CF_3$, $C_2F_5$, $C_3F_7$ and s is an integer such as to meet the aforesaid requirements. Perfluoropolyethers of class (1) are known in trade by the trademark FOMBLIN® Y or GALDEN®, those of class (2) by the trademark FOMBLIN® Z all of Montedison. Products of class (4) known in trade are KRYTOX® (Du Pont).

The products of class (5) are described in U.S. Pat. No. 4,523,039; those of class (6) are described in European patent EP 148,482 of Daikin.

The products of class (3) are prepared according to U.S. Pat. No. 3,665,041. The perfluoropolyethers described in U.S. Pat. No. 4,523,039 or in J. Am. Chem. Soc. 1985, 107, 1195–1201 are also suitable.

The surfactants used for the preparation of the microemulsion subject matter of the present invention consist of fluorinated molecules which can be ionic or non ionic. It is preferable that the surfactants have a structure similar to that of the oil as regards the hydrophobic part. In particular it can be mentioned:

a) perfluorocarboxylic acids having 5–11 carbon atoms and their salts;

b) perfluorosulphonic acids having 5–11 carbon atoms and their salts;

c) nonionic surfactants described in European patent application EP 0051526;

d) mono- and di-carboxylic acids derived from perfluoropolyethers and their salts;

e) nonionic surfactants formed by a perfluoropolyether chain bound to a polyoxyalkylene chain;

f) cationic perfluorinated surfactants or derivatives from perfluoropolyethers with 1, 2 or 3 hydrophobic chains.

As co-surfactants or co-solvents can be used:

hydrogenated alcohols having from 1 to 12 carbon atoms;

alcohols derivated from perfluoropolyethers;

alcohols formed by a perfluoropolyether chain bound to an alkylic or polyoxyalkylene chain or alcohols formed by a partially fluorinated chain.

Examples A–I demonstrate water-in-oil microemulsions which may be used according to practice of the invention.

EXAMPLE A

To 5 ml of a perfluoropolyether of class (1), having an average molecular weight of 650, there are added, 5.40 g of an acid with perfluoropolyether structure, having a carboxy functional group ($R'_f=-CF_2COOH$), containing only a few amount of bicarboxylic acid ($R_f=R'_f=-CF_2COOH$), with an average equivalent weight of 735, salified by means of 1 ml of an aqueous solution of ammonium hydroxide containing 10% of $NH_3$ by weight. The complete dissolving of the aqueous phase in the oil was achieved by heating the sample to 40° C. By cooling to room temperature, the separation occurred into two phrases, but by heating the sample back to a temperature higher than 40 °C., the microemulsion, containing 6.5% by weight of water, formed again spontaneously.

EXAMPLE B

To 6.56 of the ammonium salt of a carboxy acid having a perfluoropolyether structure, belonging to class (1), having an average equivalent weight of 700, 5 ml of the same perfluoropolyether as disclosed in Example A, and 3 ml of water are added, with one single clear phase being obtained, which is stable at temperatures higher than 30° C. Such a microemulsion can be diluted with perfluoropolyether up to 4 times its initial volume, in this case a microemulsion being obtained, which is indefinitely stable at room temperature.

EXAMPLE C 5 ml of said perfluoropolyether as disclosed in Example A dissolves 3 ml of water in the presence of 5.34 g of the ammonium salt of carboxylic surface-active agent having a perfluoropolyether structure, belonging to class (1), having an average equivalent weight of 600. A microemulsion, stable at temperature higher than 11° C., forms spontaneously.

EXAMPLE D 3.4 ml of a perfluoropolyether having an average molecular weight of 600, belonging to class (1), dissolves 2 ml of water in the presence of 1 ml of a carboxy acid having a perfluoropolyether structure, belonging to class (1), having an average equivalent weight of 694, neutralized with 0.6 ml of an aqueous solution of ammonium hydroxide, containing 20% of NH₃ by weight, and of 0.4 ml of tert-butyl alcohol. A clear phase, stable at temperatures lower than 30° C., is obtained.

EXAMPLE E 5 ml of a perfluoropolyether having an average molecular weight of 800, belonging to class (1), dissolves 1.1 ml of water and solution of ammonium hydroxide containing 10% of NH₃ by weight, in the presence of 2 ml of a carboxy acid of perfluoropolyether structure, belonging to class (1), with an average equivalent weight of 630. By simply mixing the components, a clear liquid, stable at room temperature is obtained; by heating to a temperature higher than 35° C., the separation into two phases occurs, and the product becomes cloudy; by cooling to a temperature lower than 35° C., the product turns again into a microemulsion stable over time. This microemulsion, which contains 7.9% of water, can dissolve water up to a content of 11.1% of water, with its existence range being reduced to temperature lower than 28° C. The stability range can be extended by the addition of an alcohol having molecular weight 700, deriving from a perfluoropolyether of class (1): in fact, the addition of 1.3% b.w. of alcohol is enough to have a microemulsion indefinite stable at temperature lower than 65° C.

EXAMPLE F

To 2 ml of a perfluoropolyether belonging to class (1), having molecular weight 800, 1 ml of a surface-active agent of perfluoropolyether structure belonging to class (1) and with molecular weight 690, 1 ml of NH₃ at 10% by weight, and 0.1 ml of a 1-nonanol are added. One single clear phase, stable at temperatures comprised within the range of from 0° C. to >95° C., is obtained.

By the further addition of 0.1 ml of H₂O, the stability range results to be from about 1° C. to about 62° C.

EXAMPLE G

A matrix composed by 5 ml of a perfluoropolyether having an average molecular weight of 800, 1.5 ml of PFPE-structure carboxy acid with average equivalent weight 636 and 0.5 ml of ammonium hydroxide solution at 10% of NH₃ by weight, is clear all through the investigated temperature range (from 15°–20° C. to 90°–95° C.) and contains 4.0% by weight of aqueous phase, and 74.1% by weight of oil phase. This matrix is capable of reversibly dissolving water, with the following behavior:

| Added H₂O ml | w % by weight | Range of Existence of w/OF Microemulsion |
|---|---|---|
| 0.1 | 4.8 | T ≧ 31° C. |
| 0.2 | 5.6 | T ≧ 45° C. |
| 0.4 | 7.1 | T ≧ 63° C. |

EXAMPLE H

To the matrix as disclosed in Example G, 0.2 ml of methyl alcohol is added. The system is liquid and isotropic (w=4.0%) all through the investigated temperature range; it is capable or reversibly microdispersing water, showing the following behavior:

| Added H₂O ml | w % by weight | Range of Existence of w/OF Microemulsion |
|---|---|---|
| 0.1 | 4.8 | any temperatures |
| 0.2 | 5.5 | T ≦ 73° C. |
| 0.4 | 7.0 | T ≦ 67° C. |
| 0.6 | 8.4 | T ≦ 62° C. |
| 1.0 | 11.1 | 36° ≦ T ≦ 59° C. |
| 1.4 | 13.7 | 36° ≦ T ≦ 70° C. |
| 2.2 | 18.4 | 28° ≦ T ≦ 37° C. |

EXAMPLE I

To the matrix as disclosed in Example G, 0.2 ml of ethanol is added, a system being obtained, which is liquid and isotropic all through the investigated temperature range, which microdisperses reversibly water, with the following behavior:

| Added H₂O ml | w % by weight | Range of Existence of w/OF Microemulsion |
|---|---|---|
| 0.2 | 5.5 | any temperatures |
| 0.6 | 8.4 | any temperatures |
| 1.0 | 11.1 | 23° ≦ T ≦ 85° C. |

Among the anionic surfactants utilized in P2, carboxylates are preferable.

In P1 any fluorinated surfactant, preferably (per) fluoropolyether surfactant can be utilized, generally it is of the same class of the surfactant utilized in P2.

Alkalinization methods are well known, for instance: dripping of an alkaline aqueous solution; or scrubbing of a base in the form of gas or steam.

Obviously, and this is a general criterium of the present invention, the metal cations have not to form stable complexes at the reaction temperature with the base, since it would limit or inhibit the formation of the desired oxide.

During or after alkalinization the system is heated for a prearranged time, if P3 was not already heated. The pH, the temperature and the time of heating depend on the desired oxide. For magnetic oxides temperatures higher than 60° C., generally from 70° to 100° C., are preferred.

It is possible to operate also under pressure and at higher temperatures, the limit being the degradation temperature of the surfactant.

The generation of the particles in water at high temperature, is known to favour crystallization but generally causes size growth with time. In the microemulsions of the present invention such a growth is limited and nanosize particles are obtained also after very prolonged aging at high temperature (hours, days).

As above said, at the end of the P4 phase, the system is cooled and the aqueous supernatant is separated from the particles dispersion in the fluorinated oil.

The dispersion so obtained can be purified from excess of water-soluble surfactants and inorganic salts, reaction by-products, by means of washings for instance with water, alcohols or mixtures thereof.

The concentration of the solid in dispersion is always unexpectedly higher than those of the prior art on the microemulsions, at least the double or the triple.

The Applicant has found that it is possible to further increase the solid concentration in the dispersion, for instance, by separating the solid particles, which result protected from coagulation due to the surfactant present in the reaction system, by extraction for instance removing the oil with solvents. The extracted particles can be then redispersed in a smaller quantity of perfluoropolyether oil equal or different from the previous one. In this way the solid concentration can be at least doubled.

The solvents for the oil removal are well known and are those dissolving fluoropolyether oils, such as for instance (hydro)chlorofluorocarbons.

The procedures of particles dispersion are described for instance in the above mentioned U.S. Pat. No. 5,147,573 and U.S. Pat. No. 4,094,804 in relation to the general characteristics of the surfactants to be used as dispersants for particulates and in relation to the dispersions of the prior art concerning the preparation of particles in water and to the subsequent transfer into oil. Similar criteria are valid for redispersing the particles subject matter of the present invention in case they are extracted from the oil in which they have been generated.

Characterization of dispersions and of extracted powders

The amount of magnetic powder with the surfactant adsorbed therein was determined by removing from known dispersion amounts the other components soluble in suitable solvents such as water, water/isopropanol mixture generally in the ratio 1:1 by volume and in a solvent of chlorofluorocarbon type, such as Delifrene or Freon.

The powder extracted was dried under vacuum, in the presence of silica gel, at moderate temperature, generally not higher than the temperature at which the preparation was carried out.

In order to determine the amount of surfactant bound to the particles (chemical adsorption), the dry powder was submitted to thermogravimetric analysis with a 2000 TGA-Du Pont instrument.

The loss by weight of the powder was determined after heating up to 600° C. for the complete removal of adsorbed surfactant.

By the TGA value, the actual fraction of solid in the powder was calculated and then in the fluorinated dispersion.

The type of oxide was identified by X ray diffraction according to the conventional procedures. The small size of the particles caused a broadening of the observed peaks. It was however possible to identify the produced ferrite and to exclude other undesired species.

Density measurements of the dispersions

The density value of the dispersion was determined by the pychnometric method ASTM D70-82 or considering additive the densities of the components. The value served to the calculation of the magnetic saturation in Gauss from the experimental value in emu/g.

The measurements of magnetic saturation (MS) were carried out as described by K. J. Davies, S. Wells and S. W. Charles in Journal of Magnetism and Magnetic Materials 122 (1993) 24–28, "The effect of temperature and oleate absorption on the growth of maghemite particles".

A Vibrating Sample Magnetometer, Princeton Applied Research (PAR) 155 VSM was used. The measurements were carried out at 25° C.

MS was drawn from measurements of susceptibility vs. magnetization between 8.5 and 9.5 kOe. The particle magnetic diameter is obtained from the value of the magnetic saturation and of the reduced initial susceptibility and from the sample composition by using the correlations known in literature and used by Charles in the reference cited above.

The experimental values in emu/g were converted into Gauss MS (Gauss)=MS (emu/g)*πd
wherein: d=density of the dispersion or the powder.
For the powder the tabulated density value of 5.18 g/cm$^3$ was used.

COMPARATIVE EXAMPLES 1–3

They describe the results obtained by applying the procedures of the prior art for generating particles in microemulsion to microemulsions based on perfluoropolyethers.

Cobalt ferrite is prepared according to the general formula of ferrites given above wherein M1=divalent Co, M2=trivalent Fe.

COMPARATIVE EXAMPLE 1

The procedure based on the mixing of two microemulsions was utilized, each containing a water-soluble metal salt.

The reaction system was alkalized by adding a third w/o microemulsion containing potassium hydroxide solution as aqueous phase.

The components of the microemulsions and their concentration were selected so to obtain the maximum solubilization of the aqueous phase into the oil phase.

100 g of microemulsions containing Co (indicated by µE-Co) were prepared by mixing 34 g of potassium salt of a perfluoropolyether monocarboxylic acid with repetitive units of formula 1) having average molecular weight (MW) 723, 51 g of perfluoropolyether oil Galden D02 of formula 1) and 15 g of 0.1 molar solution of cobalt chloride in distilled water. The microemulsion formed at room temperature upon mild magnetic stirring until complete solubilization was achieved.

100 g of microemulsion containing Fe (indicated by µE-Fe) were prepared, by mixing 39.5 g of the same surfactant utilized for the above first microemulsion µE-Co, 43 g of the same oil Galden D02 used above, 3.5 g of fluorinated alcohol having perfluoropolyether structure with an average, molecular weight, with repetitive units of formula 1), 676 (co-surfactant) and 14 g of 0.1 molar aqueous solution of ferric chloride. The formation of the microemulsion by mild stirring is fast as in the previous case.

100 g of microemulsion containing the base (alkaline µE) were prepared by mixing 36 g of the same surfactant used above, 44 g of the same oil and 20 g of 0.5 molar KOH aqueous solution, by operating as above.

40.1 g of µE-CO and 85.9 g of µE-Fe were mixed in these amounts to obtain cobalt ferrite.

76.16 g of the alkaline microemulsion were added to the homogeneous mixture at room temperature and under mild stirring. The reaction system, at pH of 12.7, was put in thermostat at 90° C. for 2 hours. Cooling the reaction system to room temperature, under stirring, a slightly viscous and homogeneous dispersion of solid in the reaction medium was obtained. A part of it was utilized to separate the particles by extractions with Delifrene 113 and iso-PrOH.

The characterization of the dispersion and of the particles extracted from a portion thereof gave the following results:

the concentration of solid in dispersion was of 0.077% by weight the magnetic saturation of the dispersion was too low to be measured;

the extracted powder was a magnetic black solid.

COMPARATIVE EXAMPLE 2

Two microemulsions µE-Co and µF-Fe of the previous comparative example were used, but the alkalinization was carried out by a KOH aqueous solution.

The microemulsions of this example were prepared with the maximum possible content of aqueous phase.

The structures of the used surfactants and perfluoropolyether oils (PFPE) were those of Example 1 and the molecular weights indicated hereinafter.

100 g of μE-Co were prepared by mixing 32.1 g of potassium salt of a PFPE carboxylic acid having average MW 2900, 14.2 g of potassium salt of a PFPE carboxylic acid having average MW 430, 33.4 g of oil Fomblin Y06, 13.7 g of 1 molar aqueous solution of cobalt chloride and 6.7 g of isopropylic alcohol.

100 g of μE-Fe were prepared by mixing 51 g of potassium salt of a PFPE carboxylic acid having average MW 430, 38.1 g of oil Galden D02 and 10.9 of 1 molar aqueous solution of ferric chloride.

15.05 g of μE-Co and 36.76 g of μE-Fe were mixed to obtain a molar ratio Fe/Co=2 in the reaction system which was maintained under mild stirring. A 7.65M aqueous solution of KOH up to pH 12.9, corresponding to 1.6 ml of alkaline solution, was dripped.

The system was heated at 90° C. for 24 hours. Then the system was cooled at room temperature and the aqueous supernatant was separated. A black layer remained on the bottom which was characterized.

The magnetic saturation of the dispesion resulted to be 16 Gauss (0.72 emu/g) and the particles had an average magnetic diameter of 6 nm.

The solid particles were extracted from an aliquot portion of the dispersion by removing the fluorinated phase with Delifrene A113 and the excess of surfactants with iso-PrOH. The thermogravimetric analysis of the dried powder indicated that the dispersion contained 3% of dispersed solid.

COMPARATIVE EXAMPLE 3

Attempts to incorporate both aqueous solutions of Example 2 into a single microemulsion, having the composition of μE-Co or of μE-Fe, led to systems with evident phase separtion, therefore out of the microemulsion composition range.

Other tests with various oils, surfactants and cosurfactants always of perfluoropolyether type led to the conclusion that the solubilization of a single aqueous solution containing both cobalt and trivalent iron chlorides was possible but limited to low concentration of the water-soluble reactants in the aqueous phase, for instance 0.01M in ferric salt and 0.005 in cobalt salt. The amount of aqueous solution solubilizable in oil PFPE was always lower than the amount of solubilizable solution when a single metal salt was present.

Preparation tests of ferrite in these μE(Fe+Co) micromulsions according to the procedure described in comparative example 2 led to dispersions wherein the magnetic saturation was not measurable, as in the case of the dispersion of comparative example 1, owing to the low concentration of the resulting dispersed solid.

EXAMPLES ACCORDING TO THE INVENTION

Preparation of microemulsions (μE) of Co according to P1:

The surfactants and PFPE oils have the structure of the comparative example 1.

100 g of μE-Co were prepared by mixing 32.1 g of potassium salt of a PFPE carboxylic acid having average MW 2900, 14.2 of potassium salt of a PFPE carboxylic acid with average MW 430, 33.4 g of the oil Fomblin Y06, 13.7 g of a 1 molar aqueous solution of cobalt chloride and 6.7 g of isoproylic alcohol. The microemulsion was quickly formed at room temperature by mild magnetic stirring.

Preparation of the surfactant ferric salt according to P2:

In a 1 l flask, equipped with blade stirrer and at least a neck to insert dropping funnel, 115 g of potassium salt of a PFPE monocarboxylic acid having average MW 430 and 230 ml of distilled water were mixed. Few minutes of moderate stirring were sufficient for a complete solubility.

250 ml of a 0.5 molar solution of ferric chloride in distilled water were prepared.

171 ml of the ferric chloride solution were slowly dripped, in about 1.5 hours, into the surfactant solution, under mild stirring. When mixing was over, it was let to stay overnight. The surfactant ferric salt was separated in the form of an oily liquid insoluble in water, from which it could be easily separated. The surfactant ferric salt was washed with water followed by the acqueous supernatant separation until ferric ions disappeared in the supernatant at the KSCN qualitative test. The surfactant ferric salt was dried under vacuum at about 40° C. Yields higher than 95% were obtained. The quantitative analysis of the surfactant ferric salt gave a molar ratio Fe/surfactant of 2.9.

EXAMPLE 1

23.7 g of μE-Co prepared according to P1 and 5.28 g of the surfactant ferric salt prepared according to P2 were mixed at room temperature under mild stirring.

Always under mild stirring, 1.76 ml of the 7.65 M KOH aqueous solution were dripped, bringing the reaction system from the initial pH of 2.7 to 13. The mixture was heated to 90° C. for 24 hours. After heating, the system consisted of an acqueous supernatant and a black dispersion, which was separated, an aliquot portion of it being used to quantify the concentration of solid, upon the extraction of the particles.

The dispersion had a magnetic saturation of 50 Gauss (2.21 emu/g) and the content of magnetic particles, having magnetic diameter of 8 nm, was 5.1% by weight.

EXAMPLE 2

15.23 g of μE-Co prepared according to P1 and 5.75 g of the surfactant ferric salt prepared according to P2 were mixed. The mixture was alkalinized up to pH 13 and the procedure of Example 1, with a different ratio Fe/Co in the reaction system, was followed.

After heating and separation of the supernatant, a dispersion having magnetic saturation of 26 Gauss (1.15 emu/g) with particles of average magnetic diameter of 5 nm was obtained.

The extracted powder was the 7.9% of the dispersion including the adsorbed surfactant. The pure magnetic solid was 6% of the dispersion and resulted to be formed by pure cobalt ferrite by X-ray diffraction analysis.

EXAMPLE 3

50 g of μE-Co prepared according to P1 and 18.56 g of surfactant ferric salt prepared according to P2 were mixed. 22.8 ml of a 10% KOH solution, up to pH 13, were dripped at room temperature and under mild stirring. The mixture was heated to 90° C. for 20 hours and the procedure of the previous examples was followed.

The obtained dispersion was washed with Delifrene A113 and with iso-PrOH to extract the solid with the adsorbed surfactant, then the solid was easily redispersed in PFPE oil by adding 3.88 g of Fomblin® Y06. The so obtained dispersion had a content of magnetic solid of 15% and had a magnetic saturation of 145 Gauss (6.43 emu/g). The average magnetic diameter of the redispersed particles was of 6 nm.

EXAMPLE 4

10 g of the surfactant ferric salt prepared according to P2, 0.75 g of PFPE oil Fomblin® Y06 and 2.86 g of PFPE surfactant of repetitive units of formula 1) having phosphoric polar head instead of carboxylic polar head were mixed in a lined reactor. A mixture of phosphoric mono and diester having PFPE structure, average MW of about 3600 and a content in phosphoric monoester of 79% on the total of the mixture, prepared according to the Europan Patent application 93120051.3, was utilized.

The fluorinated mixture was preheated at 90° C. under stirring and 3.69 ml of 1 molar aqueous solution of cobalt chloride were added.

In this way a PFPE reaction system containing two metals was directly obtained, meaning the direct preparation of the P3 phase.

The mixture was homogeneous under stirring and 18.8 ml of a 10% KOH solution, were slowly dripped in it up to pH 13.

When dripping was over, the system was aged at 90° C. for 20 hours. A black dispersion was obtained with a limpid supernatant which was removed. The particles were hydrophilic.

The particles were separated by extractions in water, iso-PrOH and Delifrene® A113. The extracted powder was the 14% of the dispersion and had a magnetic saturation of 61.4 emu/g (about 3800 Gauss) with particles of average magnetic diameter of 7 nm.

EXAMPLE 5

In a jar with screw plug, 10.44 g of the microemulsion prepared according to P1 and 4.84 g of the surfactant ferric salt prepared according to P2 were mixed. 0.96 ml of the KOH solution used in Example 1 were dripped at room temperature and under magnetic stirring up to pH 12.6. The mixture was aged in oven at 90° C. for 24 hours. A black dispersion, consisting of approximately the 50% wt. of the reaction mixture, was obtained with a limpid aqueous supernatant which was removed.

Its magnetic saturation was of 30.5 Gauss (1.31 emu/g), with a magnetic diameter of the dispersed particles of 5 nm.

With the same extraction procedures of the other examples the cobalt ferrite was determined to be about 6% of the dispersion.

EXAMPLE 6

Similarly to example 4, 20 g of the surfactant ferric salt prepared according to P2, 1.5 g of Fomblin Y06 and 5.27 g of the PFPE phosphoric ester mixture described in ex. 4, were mixed in a lined reaction vessel. 7.25 ml of a 1 molar acqueous solution of cobalt chloride were added to the mixture kept stirred at room temperature. Then the temperature was slowly rised to 100° C., upon stirring, and the pH of the resulting homogeneous mixture was rised to 13 by slow dripping of 50 ml of a 10% KOH solution.

The system was then aged at 100° C. for 20 hrs, cooled at room temperature where the acqueous supernatant was separated from the bottom black layer. The latter black dispersion, corresponding to the 11.3% of the overall reaction mixture, had magnetic saturation of 235 Gauss and its magnetic particles, extracted and washed with water, isopropanol and Delifrene, were the 15.6% wt. of the dispersion. Such extracted particles, dried, had a magnetic saturation of 4000 Gauss and a magnetic diameter of 7.5 nm.

The black dispersion so obtained was further purified by several washing cycles to remove the excess of surfactant and inorganic reaction by-products. The resulting particles were hydrophilic but did not display any evidence of coagulation, i.e large aggregate formation were not detected by optical microscopy where the individual particles cannot be identified due to the small size.

These hydrophilic particles were then treated with additional phosphoric PFPE surfactant, the same used in their preparation, in 20% by weight solution in Galden HT70, a PFPE oil with low vapour pressure and low viscosity to facilitate the formation of an homogeneous dispersion of the particles.

The ratio of surfactant to particles was selected in order to ensure the formation of an absorbed monolayer onto the particle surface, corresponding in this case to a weight ratio of the 20% surfactant Solution with respect to the particles of 5. Gentle stirring and a brief sonication led to an homogeneous dispersion in the Galden oil, where also a weighted amount of Fomblin Y60, a PFPE oil with much lower vapor pressure than the Galden used here, was added to achieve a weight ratio particles/Fomblin of approximately 10:90.

Due to the mutual solubility of the two PFPE oils and the presence of the surfactant, the particles were homogeneously dispersed. The Galden oil was then evaporated at 85° C. under reduced pressure for two hours and stored at room temperature.

The resulting dispersion of the particles in Fomblin Y60 had magnetic saturation of 150 Gauss with a solid content of the 9.7% by weight, it was completely hydrophobic and a droplet in contact with water could be easily moved with a small permanent magnet. No detectable changes have been found after one year aging of this dispersion, showing excellent stability against coagulation.

We claim:

1. A process for preparing dispersions containing mixed oxides of 50 nm or smaller and having narrow size distribution, comprising the following steps:

P1) preparing a water-in-oil microemulsion, the oil being a perfluoropolyether, and said microemulsion being obtained by using an anionic, cationic or nonionic perfluoropolyether surfactant, the dispersed aqueous phase of the microemulsion being a solution of an inorganic salt of a first metal, M1;

P2) preparing a metal salt of an anionic fluorinated surfactant of a second metal, M2, said metal salt being soluble in the perfluoropolyether oil used for preparing the P1 microemulsion, the amount by moles of surfactant being sufficient to fully bind to the metal cation but not being in excess;

P3) adding the salt obtained in P2 to the P1 microemulsion to obtain a reaction system containing ,the two metals M1 and M2; M1 being in the aqueous phase and M2 being in the perfluoropolyether oil phase;

P4) adding an alkali or alkali solution to the reaction system P3 with contemporaneous or subsequent heating, if P3 has not yet been heated, at the temperature necessary to form the desired oxide; then cooling and separating the aqueous supernatant; wherein M1 and M2 are metal cations selected from the group consisting of the I b, II b, III a-b, IV a-b, V a-b groups and the metals of the VII and VIII groups; wherein M1 is a metal ion having a valence equal to or lower than M2, M1 being different from Fe(II), or in admixture with Fe(II).

2. The process according to claim 1, wherein the mixed oxides are 10 nm or smaller and the heating is carried out at temperatures from 60° to 100° C.

3. The process according either claims 1 or 2, wherein the oil phase contains the salts of the metal M2 obtained according to P2.

4. The process according to claim 1, wherein M1 has a valence of 2 and is selected from the group consisting of Ni, Mn, Ca, Zn, and Ba, and M2 is a cation selected from the group consisting of Fe(III), Al(III), Ti(IV), Mn(IV), and Zr(IV).

5. The process according to claim 4, for preparing mixed oxides having formula $M1_xM2_{3-x}O_4$ wherein M1 represents one divalent metal ion and M2 represents a trivalent metal ion.

6. The process according to claim 1, wherein the oil has an average molecular weight from 500 to 10,000 and contains repetitive units selected from the following groups:

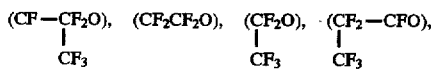

$(CF_2CF_2CF_2O)$, $(CF_2CF_2CH_2O)$, said units being statistically distributed in the polymeric chain, having neutral fluoroalkyl or perfluoroalkyl end groups.

7. The process according to claim 6, wherein the perfluoropolyether oil is a perfluoropolyether having the formula 1) 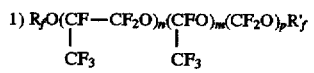

having a random distribution of the perfluorooxyalkylene units, wherein $R_f$ and $R'_f$ equal to or different from each other are —$CF_3$, $C_2F_5$, $C_3F_7$, —$CF_2H$, and n, m, and p are integers selected so that the perfluoropolyether has an average molecular weight from 500 to 10,000.

8. The process according to claim 1, wherein the obtained dispersions of mixed oxides are separated from the aqueous phase and extracted by removal of the oil with solvents and subsequent redispersion in fluoropolyether oil.

9. The process according to claim 1, wherein said metal salt of an anionic fluorinated surfactant of a second metal, M2, is a perfluoropolyether surfactant.

10. The process according to claim 1, wherein said metal salt of an anionic fluorinated surfactant of a second metal, M2, is a carboxylic perfluoropolyether surfactant.

11. The process according to claim 6, wherein said neutral fluoroalkyl or perfluoroalkyl end groups contain H.

12. The process according to claim 6, wherein said neutral fluoroalkyl or perfluoroalkyl end groups contain Cl.

* * * * *

UNITED STATES PATENT AND TRADEMARK OFFICE
CERTIFICATE OF CORRECTION

PATENT NO. : 5,670,088
DATED : September 23, 1997
INVENTOR(S) : Alba Chittofrati, et al.

It is certified that error appears in the above-indentified patent and that said Letters Patent is hereby corrected as shown below:

Claim 4, column 15, line 11, change "2and" to --2 and--.

Claim 6, column 15, line 19, before "oil" insert --perfluoropolyether--

Signed and Sealed this

Fourteenth Day of July, 1998

Attest:

BRUCE LEHMAN

Attesting Officer

Commissioner of Patents and Trademarks